United States Patent [19]
Ciastula

[11] 3,866,857
[45] Feb. 18, 1975

[54] HELICOPTERS

[75] Inventor: Tadeusz Leopold Ciastula, Yeovil, England

[73] Assignee: Westland Aircraft Limited, Yeouil, Somerset, England

[22] Filed: June 18, 1973

[21] Appl. No.: 370,779

[30] Foreign Application Priority Data
June 29, 1972 Great Britain.................... 30477/72

[52] U.S. Cl............................... 244/17.25, 74/526
[51] Int. Cl.............................................. B64c 27/76
[58] Field of Search ............. 74/526, 523, 491, 471, 74/470, 469; 244/83 R, 17.11, 17.25, 17.27, 17.15, 7 A, 6

[56] References Cited
UNITED STATES PATENTS
| | | | |
|---|---|---|---|
| 2,623,718 | 12/1952 | Ryder................................ | 244/83 R |
| 3,199,368 | 8/1965 | Funk et al............................. | 74/526 |
| 3,279,184 | 10/1966 | Felix et al......................... | 74/471 X |
| 3,429,198 | 2/1969 | Bretl..................................... | 74/526 |

Primary Examiner—George E. A. Halvosa
Assistant Examiner—Paul E. Sauberer
Attorney, Agent, or Firm—Larson, Taylor and Hinds

[57] ABSTRACT

A helicopter has a main rotor system with a plurality of rotor blades and a flying control system including a collective pitch control mechanism operative to change the pitch angle of each rotor blade by an equal amount. The mechanism includes a collective pitch control lever operable in a generally vertical plane between stops within a range of minimum and maximum flying collective pitch angle settings. When desired for certain phases of operation, the stop at the minimum setting can be overcome to permit selection of a variable negative collective pitch angle setting of the rotor blades.

8 Claims, 4 Drawing Figures

HELICOPTERS

This invention relates to helicopters, and more particularly to helicopter flying control systems.

Serious problems exist in operating a helicopter from a ship's deck, especially in adverse weather conditions, due to instability of the landing surface and high winds which combine to generate an undesirable lifting force from a rotating main rotor system. This lifting force results in serious instability of the helicopter on the landing platform.

In this specification the terms minimum, maximum and negative collective pitch angles are used. By minimum and maximum collective pitch angles we mean the extremes of a range of pitch angles used during normal flying, the minimum pitch angle usually being governed by the collective pitch angle requirements to facilitate autorotation and being, typically, between 1.5° and 2°. By negative collective pitch angle we mean any pitch angle less than the minimum pitch angle on any particular helicopter.

When operating from a level stable platform with the main rotor blades at a minimum flying collective pitch setting, any wind force is operative generally tangentially to the rotating main rotor disc, so that a minimal lift force is produced and the helicopter is stable. However, when operating from a ship's deck which is subject to pitch and roll motions, it is clear that the wind force will be intermittently effective at an angle from beneath the rotor disc, which has an effect similar to increasing the collective pitch, and results in an increased positive thrust tending to lift the helicopter from the platform. This effect, when combined with the moving platform, renders the helicopter extremely unstable, and can result in uncontrollable and extremely dangerous movements of the helicopter about the platform.

According to the invention I provide a helicopter having a main rotor system with a plurality of rotor blades and a flying control system including a collective pitch control mechanism operative to change the pitch angle of each rotor blade by an equal amount, the mechanism including a collective pitch control lever operable in a generally vertical plane between stops within a range of minimum and maximum flying collective pitch angle settings wherein the stop at the minimum setting can be overcome to select a variable negative collective pitch angle setting of the rotor blades.

The invention will now be described by way of example only, and with reference to the accompanying drawings, in which.

Figure 1:
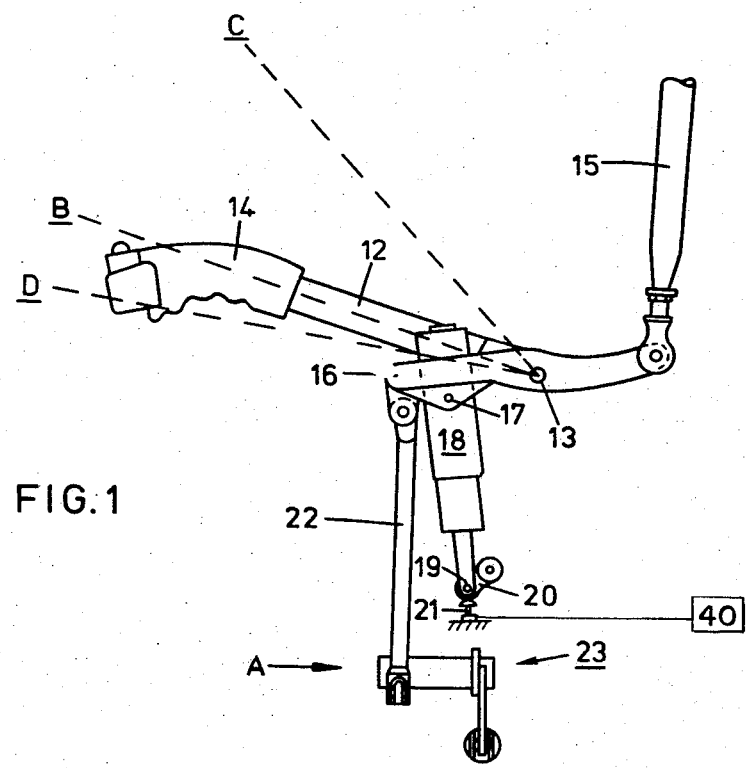
FIG. 1 is a detail view of part of a helicopter flying control system.

Referring now to FIG. 1, a helicopter has a flying control system including a collective pitch control lever 12. The collective pitch control lever 12 is pivotally mounted on an axis 13 for movement in a vertical plane to change the pitch angle of each of a plurality of main rotor blades (not shown) by equal amounts. The axis 13 is located intermediate the ends of the lever 12, one end being provided with a handle 14 and the other end being pivotally connected to a rod 15, which transmits control movements from the lever 12 to a collective pitch control mechanism (not shown). The mechanism may be operated by a hydraulic jack actuated by movement of the rod 15.

A fork end arm 16 is formed integral with the lever 12, and extends generally parallel thereto. A body of a telescopic spring strut 18 is pivotally mounted at 17 within the fork end of the arm 16, the free end of the strut 18 being pivotally connected to one end of a member 20 arranged to contact a stop shown diagrammatically at 21 when the control lever 12 is at its minimum collective pitch angle setting (B in FIG. 1). In a particular embodiment of the invention the stop 21 is formed integral with a collective/yaw interlink mechanism shown diagramatically at 40 to provide automatic yaw compensation when changes in the collective pitch angle settings are selected within the minimum to maximum range (B to C in FIG. 1). Except in so far as it provides the stop, the mechanism forms no part of the invention and in the interests of clarity is not shown in detail in the drawings.

The telescopic spring strut 18 is adapted so that during movement of the lever through the minimum to maximum range (B to C in FIG. 1), the strut acts as a fixed length lever, as will hereinafter be more fully explained.

One end of a rod 22 is pivotally connected to the end of the arm 16, the other end of the rod 22 being pivotally connected to a collective pitch stop mechanism 23.

Figure 2:
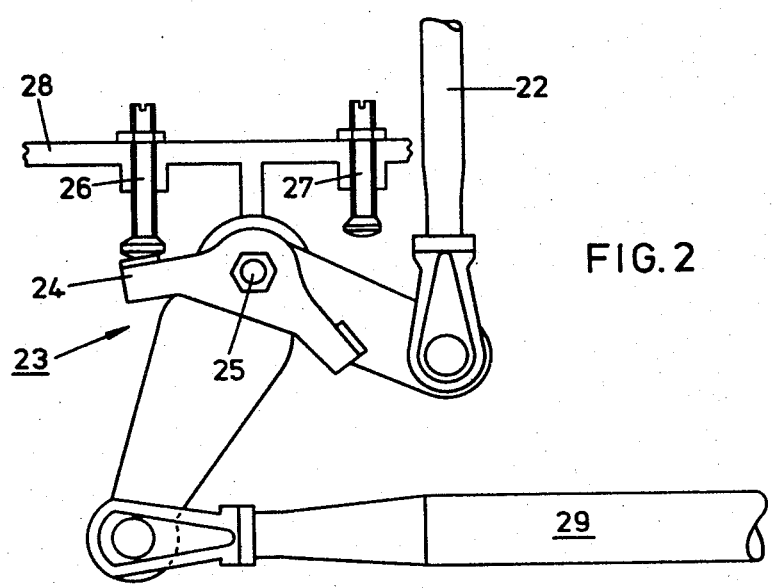
FIG. 2 is a view on arrow A of FIG. 1.

Referring now to FIG. 2, the stop mechanism 23 comprises a double-ended arm 24 mounted for rotation about an axis 25 by movement of the rod 22. The arm 24 moves between minimum and maximum collective pitch angle stop screws 26 and 27 respectively, which are adjustably mounted in helicopter structure 28. Rod 29 shown in FIG. 2 is an interconnection rod to a second collective control lever to provide a dual control facility in the particular embodiment being described, and forms no part of the present invention.

Figure 4:
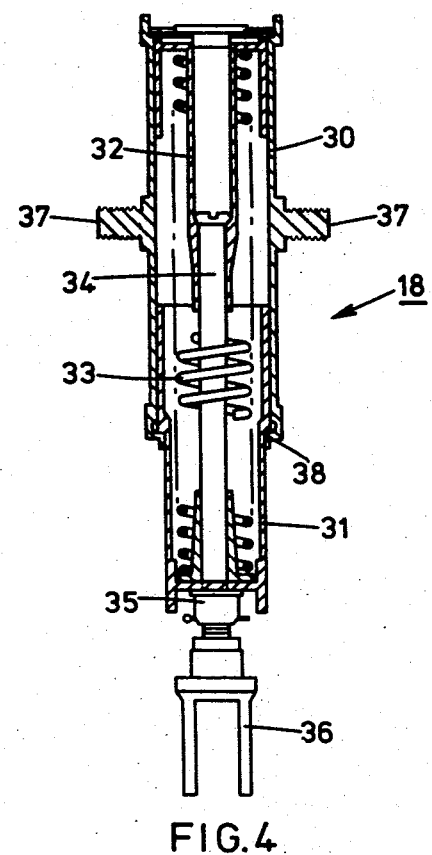
FIG. 4 is a sectioned view taken along lines 4—4 of FIG. 3.
Figure 3:
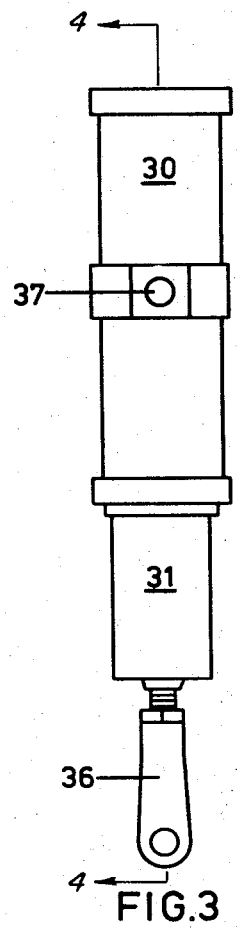
FIG. 3 is a sectioned view of a detail component of the flying control system.

FIGS. 3 and 4 show details of the telescopic spring strut 18. A hollow cylindrical body 30 is located for axial telescopic movement over the outside diameter of a hollow cylindrical chamber 31. Co-operating lips 38 on the body 30 and the chamber 31 prevent extension of the strut 18 beyond a desired length. A sliding piston 32 is located in the body 30, and has a flange providing an earth for one end of a coil spring 33 extending throughout the length of the strut 18 to abut an inner surface of the chamber 31. The spring 33 tends to maintain the strut 18 at its fully extended length, the spring tension being adjustable by a bolt 34 which retains the sliding piston 32 and passes through the end of the chamber 31 for fitment of a nut 35. A fork end 36 is locked to the threaded end of the bolt 34 for pivotal attachment to the member 20 (FIG. 1). Two diametrically opposed threaded bosses 37 are provided on the outside of the body 30 to facilitate the pivotal attachment at 17 within the fork end of the arm 16 (FIG. 1).

In the following operational description of the present invention, the resultant thrust from the rotor blades at any position within the minimim to maximum range (B to C in FIG. 1) is referred to as a positive thrust.

For normal operation of a helicopter incorporating the present invention the minimum and maximum collective pitch stop screws 26 and 27 are adjusted to contact the ends of the arm 24, so that movement of the collective pitch control lever 12 is restrained to pivot about the axis 13 between minimum (B) and maximum (C) flight collective pitch angle settings shown in FIG. 1. This phase of operation is conventional, movement of the lever 12 altering the pitch of all main rotor blades by equal amounts, thereby increasing or decreasing positive rotor thrust to control vertical movement of the helicopter. With the lever 12 at its minimum position (B), a minimum flying collective pitch setting of the rotor blades is selected which is used during autorotation procedure. Throughout this phase of operations the telescopic spring strut 18 acts as a fixed length lever by movement of the member 20 which operates the collective/yaw interlink mechanism (if fitted).

When the helicopter is required to operate from hazardous bases such as a ship's deck the following procedure is adopted.

The minimum pitch stop screw 26 (FIG. 2) is adjusted away from its contact surface on the arm 24 by any desired amount. A resiliently maintained stop force is now provided at the minimum setting (B) of the collective pitch control lever 12 by the spring 33 in the telescopic spring strut 18, which provides a definite stop force at this position. However, by depressing the lever 12 the pilot can overcome the action of the spring 33 to telescope the strut 18 and allow the collective pitch control lever 12 to move to a negative collective pitch angle setting (D in FIG. 1). The stop screw 26 can be positioned so that at the negative position (D) of the lever 12 the resultant thrust from the main rotor blades can be either zero or any desired degree of negative thrust.

During this phase of operation the collective/yaw interlink mechanism, if fitted, is not required and is automatically rendered non-operational.

Immediately the helicopter touches down on a landing surface the pilot selects neutral cyclic pitch and the negative collective pitch angle setting (D) of the lever 12 which, depending on the position of the stop 26, results in either a zero or negative resultant thrust from the main rotor blades to ensure stability of the helicopter on an unstable platform until such time that the helicopter is adequately secured by the ground crew. It will be apparent that, in the case where a negative resultant thrust is produced, the helicopter will actually be pressed onto the landing surface by a force which varies depending on the degree of negative thrust selected.

The present invention effectively overcomes the problems associated with operating a helicopter from an unstable platform such as a ship's deck especially in relatively high wind conditions by ensuring stability of the helicopter before take-off and on landing, thereby greatly increasing the operational capabilities with safety and reliability. During normal flight of the helicopter adapted to use the minimum (B) to negative (D) setting range, the definite stop force facilitated by the spring 33 in the telescopic spring strut 18 at the normal minimum flight collective pitch angle setting (B) ensures that inadvertant selection to the negative collective pitch angle setting (D) will not be made.

Known types of automatic deck lock securing means such as a harpoon system could also be incorporated in a helicopter embodying the present invention. In this case the negative thrust position of the collective pitch control lever 12 is selected to maintain the helicopter stable until the deck lock system is engaged.

Although one embodiment only has been described and illustrated it is to be understood that various modifications can be made without departing from the scope of the appended claims. For instance, the stop at the negative collective pitch angle setting could be formed integral with the telescopic spring strut 18 or within a hydraulic collective pitch operating jack. A selection mechanism could be incorporated in the cockpit to enable a pilot to select either the normal flying collective pitch range or the range including the negative pitch setting according to our invention, so that an unscheduled landing can be readily and safely accomplished on an unstable surface. The telescopic spring strut 18 can be replaced by other suitable means such as a gate mechanism operative to separate the vertical plane of operation of the lever 12 in the minimum to maximum range from the vertical plane of operation of the lever 12 in the minimum to negative collective pitch range.

I claim as my invention:

1. A helicopter having:
    a main rotor system with a plurality of rotor blades,
    a control system including a collective pitch control means for changing the pitch angle of each rotor blade by an equal amount,
    said control means including a control lever operable in a generally vertical plane between opposed minimum and maximum stops which establish, respectively, minimum and maximum ends of a range of flying collective pitch angle settings,
    said minimum stop including means for concurrently forming said minimum stop and also permitting that minimum stop position to be overrun by movement of the said lever beyond said minimum stop position to a negative collective pitch angle setting of the rotor blades, and wherein the extent of the said overrun is variable.

2. A helicopter as claimed in claim 1, wherein the minimum stop comprises a resiliently maintained stop force which is overcome by pressure applied to the said control lever.

3. A helicopter as claimed in claim 2, wherein the stop force is provided by a spring.

4. A helicopter as claimed in claim 3, wherein the spring is a compressible coil spring.

5. A helicopter as claimed in claim 4, wherein the coil spring is located in a telescopic strut to normally maintain the strut at its fully extended position.

6. A helicopter as claimed in claim 5, wherein the telescopic strut is pivotally mounted between the control lever and helicopter structure so that during movement of the control lever within the minimum to maximum range the strut acts as a fixed length lever, and when the control lever is moved beyond the minimum position to the negative setting the strut is telescoped against the force of the coil spring.

7. A helicopter as claimed in claim 6, wherein the helicopter structure comprises a pivotal member mounted for movement with the telescopic strut between the range of minimum and maximum settings and associating with stop means to prevent movement of the member during movement of the control lever between the minimum and negative collective pitch settings.

8. A helicopter as claimed in claim 7, wherein the stop means is formed integral with a collective/yaw interlink mechanism operated by movement of the pivotal member.

\* \* \* \* \*